(12) United States Patent
Kortüm et al.

(10) Patent No.: US 6,626,003 B1
(45) Date of Patent: Sep. 30, 2003

(54) PROCESS FOR AUXILIARY AIR CONDITIONING OF A MOTOR VEHICLE

(75) Inventors: Franz-Josef Kortüm, Pfaffenhofen (DE); Reinhard Wecker, Eichenau (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/492,840

(22) Filed: Jan. 27, 2000

(Under 37 CFR 1.47)

(30) Foreign Application Priority Data

Jan. 30, 1999 (DE) .............................. 199 03 769

(51) Int. Cl.$^7$ .............................................. F25B 27/00
(52) U.S. Cl. ........................................ 62/235.1; 62/244
(58) Field of Search .................... 62/239, 235.17, 62/244

(56) References Cited

U.S. PATENT DOCUMENTS

| | | | | |
|---|---|---|---|---|
| 3,943,726 A | * | 3/1976 | Miller | 62/235.1 |
| 4,261,329 A | * | 4/1981 | Walsh et al. | 126/569 |
| 4,307,575 A | * | 12/1981 | Frosch et al. | 62/235.1 |
| RE31,156 E | * | 2/1983 | Dessert | 180/2 A |
| 4,658,597 A | | 4/1987 | Shum | |
| 4,658,599 A | * | 4/1987 | Kajiwara | 62/244 |
| 4,955,203 A | * | 9/1990 | Sundhar | 62/244 |
| 5,157,271 A | * | 10/1992 | Fujiwara | 307/10.7 |
| 5,248,278 A | * | 9/1993 | Fuerst et al. | 454/129 |
| 5,275,012 A | * | 1/1994 | Dage et al. | 219/202 |
| 5,545,261 A | * | 8/1996 | Ganz et al. | 136/251 |
| 5,672,101 A | * | 9/1997 | Thomas | 454/136 |
| 5,826,435 A | * | 10/1998 | Hange | 62/235.1 |

FOREIGN PATENT DOCUMENTS

GB 2317445 * 3/1998 ............. F24F/5/00

OTHER PUBLICATIONS

Japanese Patent Abstract No. 58–67510, Apr. 22, 1983, English Abstract, Masahiko Suzuki.
Japanese Patent Abstract No. 58–67511, Apr. 22, 1983, English Abstract, Masahiko Suzuki.
Japanese Patent Abstract No. 60–53423, Mar. 27, 1985, English Abstract, Katsunori Komatsu.

* cited by examiner

*Primary Examiner*—William E. Tapolcai
*Assistant Examiner*—Mohammad M. Ali
(74) *Attorney, Agent, or Firm*—Nixon Peabody LLP; David S. Safran

(57) ABSTRACT

Process for air conditioning of the passenger compartment of a motor vehicle by means of an air conditioning system (7) using solar power which is obtained via at least one solar module (1) which is attached to the motor vehicle, especially on the motor vehicle roof, and which is also used for charging a battery (4) of the motor vehicle, in which the solar power is used additionally or alternatively to charge the motor vehicle battery (4), and also to operate a ventilation system (6) when the vehicle is unoccupied, and in which the air conditioning system (7) is activated prior to entry of a passenger into the passenger compartment, the air conditioning system being operated so as to draw most of its power from the motor vehicle battery (4).

7 Claims, 1 Drawing Sheet

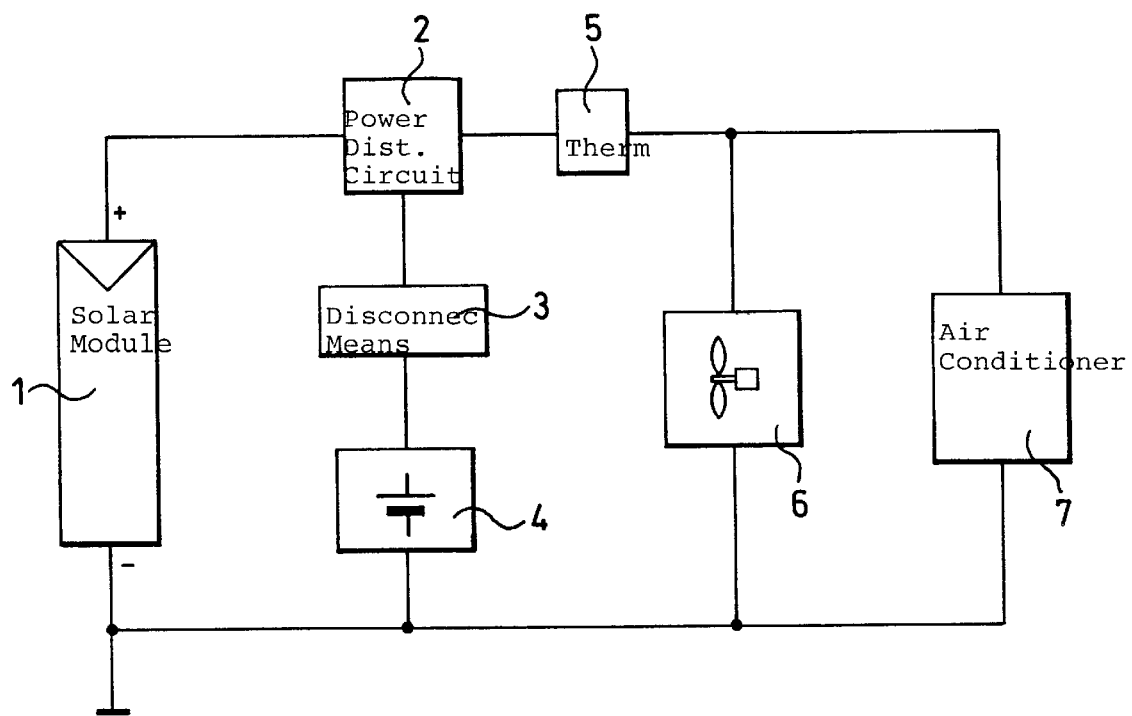

PROCESS FOR AUXILIARY AIR CONDITIONING OF A MOTOR VEHICLE

BACKGROUND OF THE INVENTION

1. Field of the Invention

This invention relates to a process for auxiliary air conditioning of the passenger compartment of a motor vehicle by means of an air conditioning system using solar power which is obtained via at least one solar module which is attached to the motor vehicle, especially on the motor vehicle roof, and which is also used for charging the battery of the motor vehicle.

2. Description of Related Art

Passenger compartments of motor vehicles at rest during hot weather heat up to unpleasantly high temperatures, especially when they are exposed to full sun, typically from 60° to 80° C. The result of these extremely high passenger compartment temperatures is, among others, a heat shock when entering a passenger compartment heated Up in this way. Accordingly highly heated passenger seats are especially problematical, and can cause the passenger to have a very unpleasantly sweaty back. With operation of the air conditioning system, this can even lead to health problems. The correspondingly highly heated steering wheel and possibly the heated-up instrument panel are also unpleasant. Even if ventilation is immediately started at the highest stage when entering a passenger compartment which has been heated up to this degree, it takes a few minutes until a bearable temperature has been established in the passenger compartment by these air conditioning measures.

There has long been a need for effective air conditioning of the passenger compartment at rest before the driver and possibly the passengers enter the passenger compartment. Various proposals have been made in this area which, however, with respect to the required energy costs are problematical. In particular, it has been proposed that solar energy be used to ventilate or air condition the passenger compartment, as is explained below.

Accordingly, for example, U.S. Pat. No. 4,658,597 discloses using the initially mentioned process for auxiliary air conditioning of the passenger compartment of a motor vehicle by means of a auxiliary air conditioning system using solar energy. This known process is designed such that the solar energy obtained by the solar module is used, first of all, as a priority for operation of the auxiliary air conditioning system which, in the conventional manner, routes cool air into the passenger compartment. For the case in which, during operation of the auxiliary air conditioning system, energy is left over, it is supplied specifically to the motor vehicle battery to charge it. Otherwise, the motor vehicle battery is not involved in operation of the auxiliary air conditioning system. One condition for starting the auxiliary air conditioning system is that the temperature in the passenger compartment exceeds a threshold. Otherwise, the auxiliary air conditioning system is not activated. In this known process, the problem is supplying the auxiliary air conditioning system solely from the solar module. On the filing date of this U.S. patent, solar modules with a power sufficient to operate a conventional auxiliary air conditioning system with relatively moderate efficiency were not yet available. Even today, a solar module which can be used, for example, on the roof of a motor vehicle, only delivers a power of a maximum 150 W, while an air conditioning system as was available at the filing date of the noted U.S. patent has a power consumption of at least 7 to 8 kW. Even when using a higher efficiency auxiliary air conditioning system as is currently available, this concept cannot be accomplished since the solar module which can be used in conjunction with a motor vehicle does not deliver the necessary power to operate the air conditioning system long enough to sufficiently reduce the temperature of up to 80° C. which arises in the passenger compartment exposed to the sun.

Another measure for air conditioning of the passenger compartment of a motor vehicle is known, for example, from Japanese Patent Abstracts Nos. 58-67510, 58-67511 and 60-53423, by means of solar energy from a solar module on the roof of a motor vehicle, to operate a fan for ventilation of the passenger compartment which intakes outside air, preferably from under the motor vehicle into the passenger compartment, and pushes hot air out of ventilation slots of the motor vehicle. The two publications named first, moreover, disclose cooling specific parts of the passenger compartment, in particular, the seats and the steering column with the steering wheel, by the air flow which is delivered by the solar current activated fan into the passenger compartment. With this measure, at least with direct delivery of cooler air into the passenger compartment, the interior temperature of the passenger compartment, before embarking, can be reduced by roughly 20 to 30° C. i.e., starting from the temperature of the passenger compartment with direct incident solar radiation from 80° C. to a temperature of 50 to 60° C. This final temperature in the passenger compartment is, however, not enough for the driver and passengers to be comfortable in the passenger compartment.

SUMMARY OF THE INVENTION

In view of this prior art, the primary object of the present invention is to improve the initially mentioned process for auxiliary air conditioning of the passenger compartment of a motor vehicle such that a passenger compartment with strong incident solar radiation at rest can be cooled down to a pleasant temperature before embarking without overloading the associated power supply assemblies.

This object is achieved by the solar power is used additionally or alternatively to charge the motor vehicle battery, and also to operate an auxiliary air conditioning system, and the air conditioning system being activated shortly before setting off and drawing most of its power from the motor vehicle battery.

The invention suggests a new air conditioning concept according to which, proceeding from the solar module which makes the power available, primarily the motor vehicle battery is fully charged in order to adequately make available the energy necessary for brief operation of an air conditioning system. But, before the air conditioning system is activated at rest, it is provided in accordance with the invention that, at the same time as battery charging, the auxiliary ventilation system is provided with some of the power produced by the solar module. The auxiliary ventilation system requires relatively little power and thus can be easily operated over a longer interval, preferably over the entire interval of incident solar radiation, without greatly degrading battery charging. As mentioned initially, using the auxiliary ventilation system can lower this temperature in the passenger compartment by 20 to 30°. Proceeding from this temperature level of a maximum 50 to 60°, which is then reached, an air conditioning system can be effectively used such that in a relatively short time, typically within roughly 10 minutes, the temperature in the passenger compartment is lowered so far that it is tolerable for the driver or embarking passengers.

In other words, the concept according to the invention calls for making available a sufficient amount of energy for brief operation of the air conditioning system at rest which is designed to take over the main air conditioning of the passenger compartment at rest. This means that the energy necessary for operating the auxiliary air conditioning system is obtained indirectly from the solar module whose energy is stored in the motor vehicle battery with the objective of complete charging. Before actual air conditioning, however, in accordance with the invention, parallel to battery charging, the stage of preliminary air conditioning using the auxiliary ventilation system is connected to lower the high temperature in the passenger compartment to a level from which the air conditioning system is able, based on its efficiency, to produce a tolerable temperature in the passenger compartment when the motor vehicle engine is not operating.

Advantageously, a low power air conditioning system, for example, an electrically operated air conditioning system with a COP (coefficient of performance) of 3 to 5 is used as the auxiliary air conditioning system. Therefore, when a 12 V battery with a capacitance of 60 Ah is available, for example, it delivers less than 15 Ah of power to operate the air conditioning system at an electrical power consumption of an electrical air conditioning system of 1 kW (corresponding to a cooling power of 3 . . . 5 kW) for 10 minutes of operation of the air conditioning system at rest. An air conditioning system of such small performance can optionally also be used for air conditioning while driving, the air conditioning system in this case being supplied conventionally from the generator or the engine. One such low power air conditioning system can even completely replace a conventional air conditioning system under certain circumstances, especially in motor vehicles with a smaller interior, since good preliminary cooling, and thus sufficient comfort, can be achieved by the process of the invention.

Alternatively to the low power air conditioning system with high efficiency, a motor vehicle air conditioning system which is used when the vehicle is driving and which is driven by its engine can be decoupled from the engine and operated with reduced power, for example, half power, as an auxiliary air conditioning system for the process in accordance with the invention. Thus, for example, in a two-cylinder compressor, one cylinder can be shut down by opening the decompression valve or opening a magnetic clutch. Of course, this also applies in multi-cylinder compressors for turning off one or more cylinders.

To prevent the motor vehicle battery from being overloaded by supplying power in the air conditioning system at rest under unfavorable conditions, advantageously, there is a disconnecting means by which the connection of the battery to the air conditioning system is interrupted when the battery voltage becomes low.

To solve the problem of heated motor vehicle seats, a heated steering wheel and optionally a heated instrument panel, i.e., parts which come into contact with the passengers in the passenger compartment, it is provided that these parts are preferably cooled by the air conditioning system.

In the following, the invention is explained by way of example using the drawings.

BRIEF DESCRIPTION OF THE DRAWINGS

The sole FIGURE of the drawings schematically shows a system for executing the process in accordance with the invention for auxiliary air conditioning of the passenger compartment of a motor vehicle.

DETAILED DESCRIPTION OF THE INVENTION

The system in accordance with the invention comprises a solar module 1 which is preferably integrated into the roof of a motor vehicle. The solar module 1 is placed, for example, with its negative pole on the vehicle ground. The positive pole of the solar module 1 is connected via a power distribution circuit 2 with the power consumers 6, 7 of this system, and on the other hand, with the motor vehicle battery 4 which in the conventional manner is grounded with one pole (negative pole). Between this power distribution means 2 and the battery 4, a disconnection means 3 is connected which decouples the battery 4 from the power distribution means 2 with respect to power delivery from the battery 4 to the power distribution means 2.

The power distribution means 2 operates such that, first of all, or as a priority, the battery 4 is charged by the solar module 1. This means that the battery 4 is charged while driving in the conventional manner via the motor vehicle generator and at rest the main portion of the for example roughly 80% of the energy obtained by means of the solar module 1 is added to this charge. The power distribution means 2 further delivers the portion of energy needed to charge the battery 4 directly to the power consumers of the system, specifically on the one hand, to an auxiliary ventilation system 6, and on the other, to the air conditioning system 7, which are connected parallel to the arrangement composed of the power distribution means 2, the disconnection means 3 and the battery 4.

A thermostatic switch 5, which disconnects the ventilation system and the auxiliary air conditioning system below a fixed temperature of the passenger compartment of, for example, 25°, from the battery 4 and the power distribution means 2 is connected directly downstream of the power distribution means 2. When a preset temperature is exceeded, the assemblies 6 and 7 are supplied with power from the battery and/or the solar cell 1.

Instead of a fixed setpoint of the thermostatic switch 5, the set point of a temperature adjusted on an automatic air conditioning device of the motor vehicle can be used. Optionally, the thermostatic switch 5 can also influence only operation of the air conditioning system 7, conversely, the auxiliary ventilation system 6 is operated independently thereof.

The system is designed such that, at rest, parallel to battery charging, first the auxiliary ventilation system is in operation to lower the temperature in the passenger compartment by roughly 20 to 30° by the auxiliary ventilation system intaking (cool) fresh air into the passenger compartment and pushing hot air out of the passenger compartment via ventilation slots. As soon as the battery has reached its completely charged state, the power distribution means directs all of the power produced by the solar module 1 to the auxiliary ventilation system 6, by which its performance rises considerably so that the desired temperature reduction of 20 . . . 30° C. is ensured with high probability before starting up the auxiliary air conditioning system 7 on days with intense solar radiation. Shortly before the passengers or driver enter the passenger compartment, the air conditioning system 7 is activated, either controlled by a timer or by means of remote control; the air conditioning system 7 is typically in operation for roughly 10 minutes before it is again turned off to save the battery. Within this interval the auxiliary air conditioning system 7, as a result of preliminary air conditioning by means of the auxiliary ventilation system 6 is able to lower the temperature in the passenger compartment to an acceptable level without endangering the ability of the engine to start.

We claim:

1. Process for air conditioning of a passenger compartment of a motor vehicle by means of an air conditioning system having a compressor using solar power which is obtained via at least one solar module which is attached to the motor vehicle and which is also used for charging a battery of the motor vehicle, comprising steps of:

utilizing the solar power to charge the motor vehicle battery and to operate an auxiliary ventilation system; and operating the compressor-based air conditioning system for a limited period of time prior to entry of a passenger into the passenger compartment, wherein the compressor-based air conditioning system is operated so as to draw most of its power from the motor vehicle battery.

2. Process as claimed in claim 1, wherein a low power air conditioning system with a COP (coefficient of performance) of 3 to 5 is used as the auxiliary ventilation system.

3. Process as claimed in claim 1, wherein the compressor-based air conditioning system is also used when the vehicle is driving by being driven by an engine of the motor vehicle, the compressor-based air conditioning system being decoupled from the engine and operated with reduced power when operated, prior to entry of a passenger into the passenger compartment, drawing most of its power from the motor vehicle battery.

4. Process as claimed in claim 1, wherein the motor vehicle battery is disconnected from the auxiliary ventilation system and the compressor-based air conditioning system when battery voltage is below a predetermined voltage level.

5. Process as claimed in claim 1, wherein the parts of the motor vehicle which come into contact with passengers in the passenger compartment are preferentially cooled by the compressor-based air conditioning system.

6. Process as claimed in claim 1, wherein the compressor-based air conditioning system is an electrical air conditioning system which operates at full power during driving powered by an onboard vehicle electrical system connected to a generator, and which works with reduced power from at least one of the solar module and the battery prior to entry of a passenger into the passenger compartment.

7. Process for air conditioning of a passenger compartment of a motor vehicle by means of an air conditioning system having a compressor using solar power which is obtained via at least one solar module which is attached to the motor vehicle and which is also used for charging a battery of the motor vehicle, comprising steps of:

utilizing the solar power to charge the motor vehicle battery and to operate an auxiliary ventilation system; and operating the compressor-based air conditioning system for a limited period of time prior to entry of a passenger into the passenger compartment, wherein the compressor-based air conditioning system is operated so as to draw most of its power from the motor vehicle battery and wherein said auxiliary ventilation system is operated in a preliminary cooling phase prior to commencing operation of said compressor-based air conditioning system.

* * * * *